May 16, 1939. E. B. NEWILL ET AL 2,158,297
SEAL FOR REFRIGERATING APPARATUS
Filed March 31, 1933   3 Sheets-Sheet 3
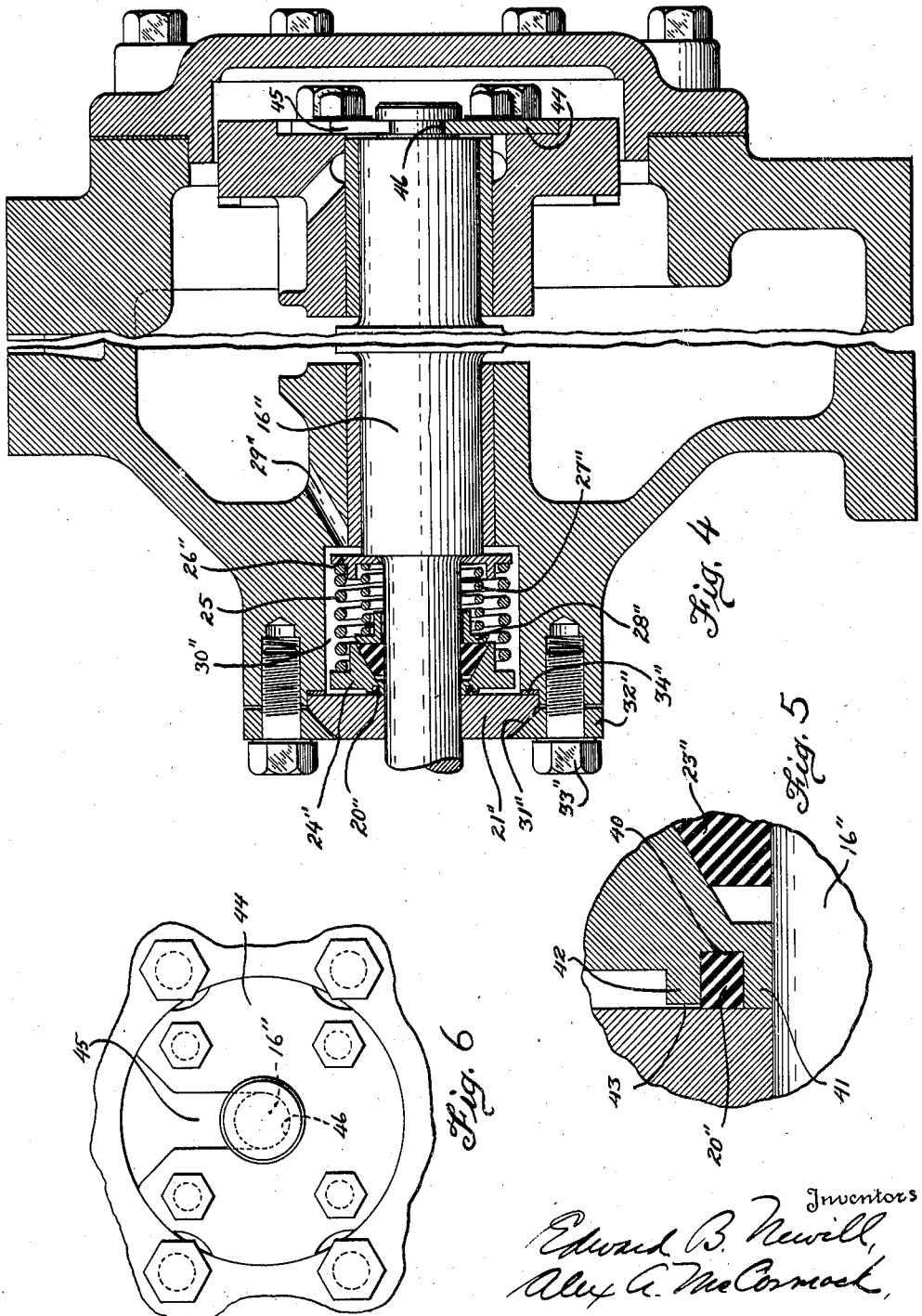

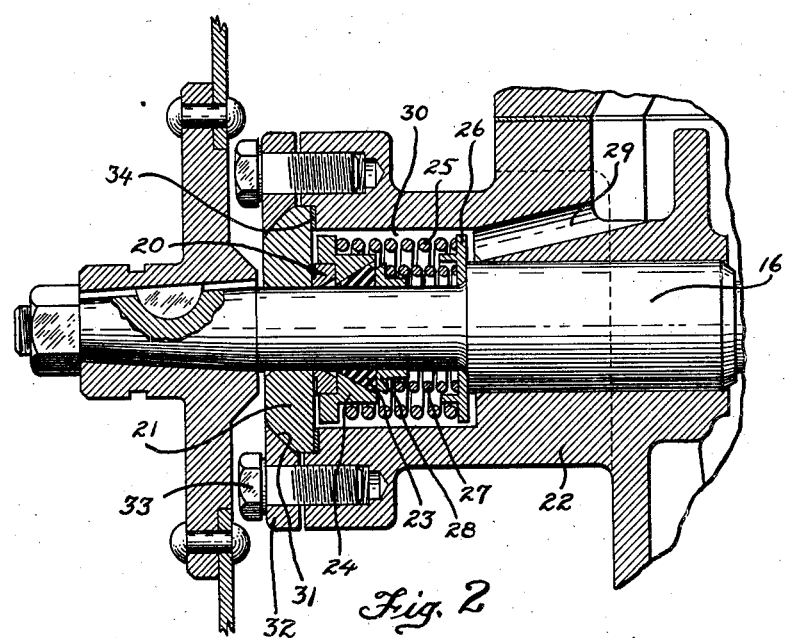
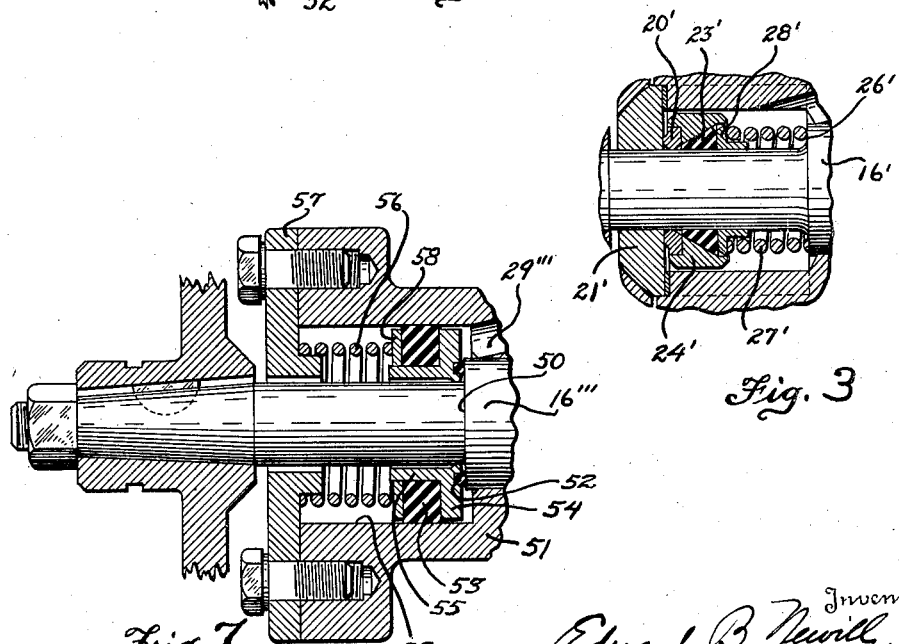

Patented May 16, 1939

2,158,297

UNITED STATES PATENT OFFICE 2,158,297

SEAL FOR REFRIGERATING APPARATUS

Edward B. Newill and Alex A. McCormack, Dayton, Ohio, assignors, by mesne assignments, to General Motors Corporation, a corporation of Delaware Application March 31, 1933, Serial No. 663,815

4 Claims. (Cl. 286—7)

This invention relates to seals for moving shafts, and more particularly to seals for the moving shafts of compressors of refrigerating systems.

Heretofore it has been customary to provide a seal between the moving parts of a compressor which pass through the casing from the interior to the exterior of the compressor to prevent egress of refrigerant or ingress of air along the shaft. Among the most extensively used and most satisfactory seals heretofore used in refrigerating machines, smooth hard surfaces have been pressed against each other where relative rotation takes place, and the sealing action at these surfaces depends largely on the presence of oil or other sealing liquid to prevent the flow of gaseous fluid between the surfaces. Where the mechanism operates intermittently, as is the case with refrigerating systems of the automatic type, and particularly when such mechanism is likely to remain idle for sometime, as during transportation or storage, the oil or sealing liquid is likely to evaporate or otherwise become removed from the sealing surfaces. When this happens, the refrigerant not only escapes, but the sealing surfaces are likely to become scored when the dry surfaces begin to rotate before oil can be fed to them, and thus the effectiveness of the seal is destroyed and the refrigerating system is consequently rendered inoperative or unsatisfactory. We have discovered that these difficulties may be overcome by providing for one or both of the relatively moving surfaces, any of the class of yielding, rubber-like materials and that these materials may work against each other or against a metal or other suitable relatively moving surface, such as hardened steel and thus provide a seal of superior qualities. Because of the rubber-like qualities of one surface, an effective seal is maintained even when the oil or other sealing liquid has been removed while the mechanism is idle, and when the mechanism starts, even while the sealing surfaces are dry, no scoring occurs during the interval while the surfaces run dry before they are lubricated by the action of the system.

Furthermore, where the two relatively moving metallic surfaces have been used heretofore, these surfaces have had to be very carefully prepared to insure extreme smoothness and cleanliness, and to maintain the proper relative hardness of the two surfaces. By providing our improved seal, as herein described, the necessity for such extremely careful preparation is removed.

We also have discovered that the metallic bellows heretofore commonly used can be dispensed with by a structure which includes a take-up member of this same type of synthetic yielding rubber-like material. This take-up may be used with the previous relatively moving metallic surfaces or with our improved combination of relatively moving surfaces; and when so used, a seal of improved performance is obtained.

Any yielding rubber-like material which has the toughness and resembles vulcanized rubber may be used, provided it is capable of resisting wear during movement relative to another sealing surface such as one made of the material itself or of different material, such as hardened steel. Furthermore such material should remain relatively unchanged as to volume and other characteristics in the presence of the refrigerants and oils being used. One class of materials, which we now prefer to use, are the synthetic rubbers known as the polymers of chloro-2-butadiene-1,3. This class of materials is now known as "Duprene", and in their finished form resemble vulcanized rubber, but differ therefrom in that they are not harmed by the presence of the refrigerants now in common use, such as the chlorine derivatives of the hydrocarbons, for example methyl and ethyl chlorides, or the fluorine derivatives of the hydrocarbons, such as $CCl_2F_2$ or $C_2Cl_2F_4$, or by the presence of the common lubricants derived from methane such as mineral oil.

Further objects and advantages of the present invention will be apparent from the following description, reference being had to the accompanying drawings, wherein a preferred form of the present invention is clearly shown.

In the drawings:

Fig. 2 is an enlarged cross-sectional view of a portion shown in Fig. 1;

Fig. 3 is a modification of a portion of the mechanism shown in Fig. 2;

Fig. 4 is a cross-sectional view, similar to Fig. 2, but showing a slightly modified form of the seal;

Fig. 5 is an enlargement of a portion of Fig. 4; and

Fig. 6 is an end view of a portion of Fig. 4; and

Fig. 7 is a cross-section of a further modification.

Figure 1:
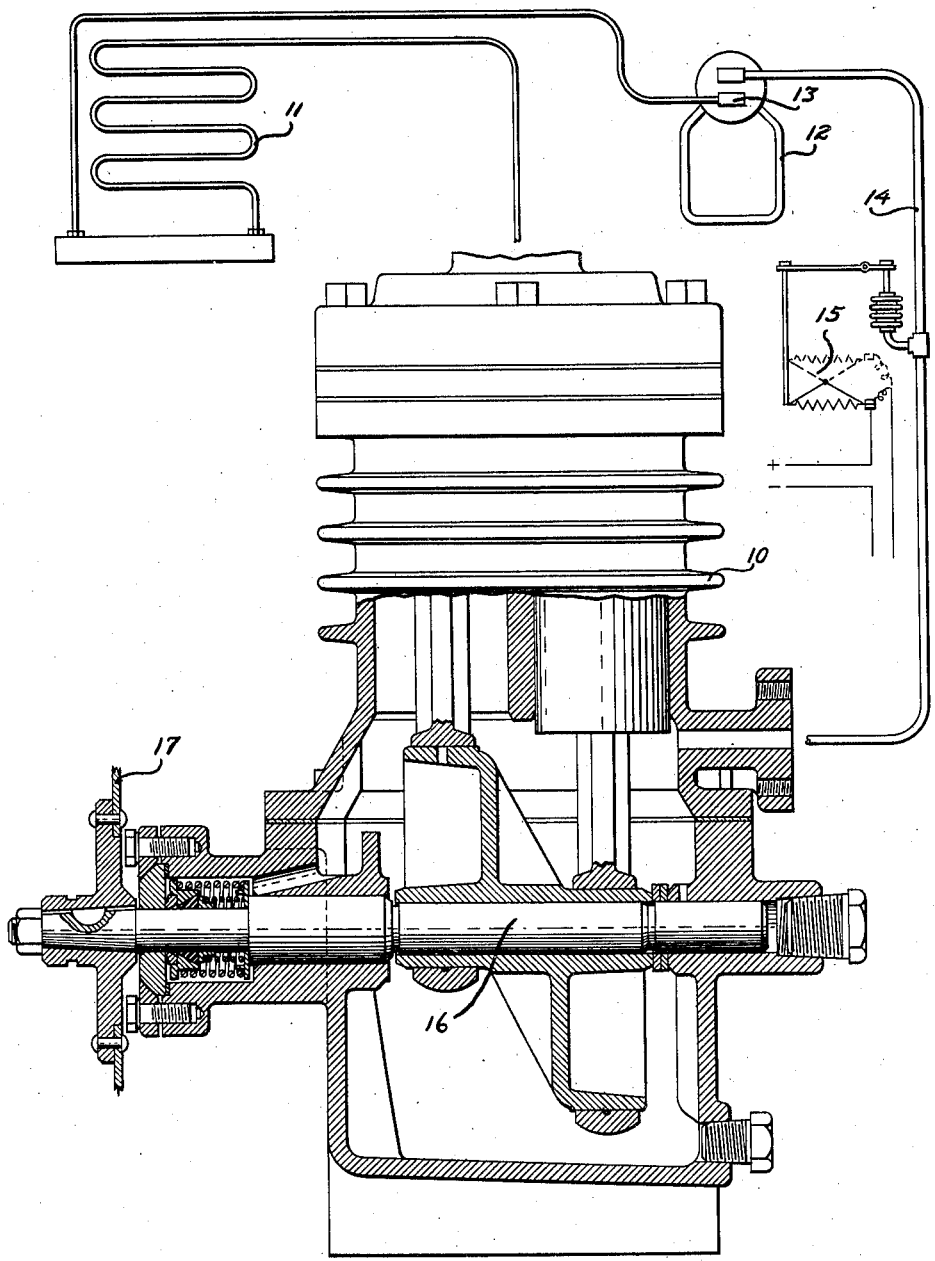
Fig. 1 is a view partly diagrammatic and partly in cross-section of a refrigerating system embodying features of this invention.

A refrigerating system embodying features of this invention includes, in general, a compressor 10, condenser 11 and evaporator 12 arranged in closed circuit relationship and through which refrigerant is circulated. These members are well known in the refrigeration art and need not be further described, other than to mention that the evaporator is provided with a float controlled inlet valve connected to the fitting 13, and that the suction line 14 is provided with a snap acting switch 15 responsive to the pressures therein which controls the starting and stopping of the motor driving the compressor 10. The motor, not shown, and which is controlled by the switch 15, rotates the shaft 16 either by being directly connected thereto, or by a belt drive running over the pulley which is partially shown at 17. Any of the well known refrigerants, elsewhere described, may be circulated through the system, and the moving parts may be lubricated by any of the well known lubricants elsewhere described.

The seal for the compressor as shown in Figs. 1 and 2 includes a rotatable shaft member comprising a shaft 16 and a part or ring 20 which is provided with a surface which is relatively movable with respect to a part 21 of the stationary casing member 22. A yielding take-up is provided between one of the parts, in this case part 21 and its corresponding member. Thus in Figs. 1 and 2, the yielding take-up includes a cone-shaped ring 23 around the shaft 16. This cone-shaped ring 23 is made of a yielding rubber-like material as elsewhere described such as a polymer of chloro-2-butadiene-1,3 and bears against a metallic cone-shaped ring 24 which in turn carries the bearing metal ring or part 20, which in this particular embodiment may be a graphite bearing metal such as is described in the patent to Edmund J. Copeland 1,329,348, or any other suitable bearing metal. A spring 25 bears against the ring 24 at one end and against a ring 26 at the other. Another spring 27 bears against the ring 23 through the medium of a washer 28. One or more passageways 29 may be provided between the crankcase and the sealed chamber 30 to convey lubricant to the sealed chamber 30 as it is splashed in the crankcase. The part 21 may be a ring having a spherical surface 31, on its outer side which in turn bears against an outer ring 32 which is clamped against the main portion of the casing through the medium of bolts 33. A gasket 34 is interposed between the ring 32 and the main portion of the casing 22.

In operation, the rings 20, 24, 23, 28 and 26, together with the springs 25 and 27 rotate with the shaft. The surface between the rings 20 and 21 is a smooth sealing surface which prevents the passage of gas into or out of the refrigerating system. The spring 25 maintains the rings 20 and 21 together and the spring 27 by its axial thrust wedges the elastic ring 23 both against the inner conical surface of the ring 24 and against the cylindrical surface of the shaft 16. At this point therefore a yielding take-up is provided which at the same time hermetically seals the gases against passage between the surfaces of the rings 24, 23 and the shaft 16. It is to be understood that the rings 20 and 24 are secured together by soldering, brazing or the like, so that the surfaces therebetween are hermetically sealed.

In the modification shown in Fig. 3, the spring 25 of Fig. 2 has been omitted, and the spring 27' corresponding to the spring 27 of Fig. 2, performs both functions which were performed by the springs 25 and 27 in Fig. 2. Thus the spring 27', bearing against the shoulder 26' of the shaft 16' creates an axial thrust against the ring or washer 28' which in turn creates an axial thrust on the resilient ring 23' made, for example, of a polymer of chloro-2-butadiene-1,3. This axial thrust slides the ring 23' along the shaft until the ring 20' is moved firmly against the ring 21', the thrust being carried through the medium of the ring 24'. It is to be understood, that the portions marked with the symbol ' in Fig. 3 correspond to or have the same function as the similarly numbered members in Fig. 2. After the axial thrust has been stopped by the firm contact between the rings 20' and 21', the further thrust of the spring 27' hermetically seals the surfaces between the rings 24', 23' and the shaft 16' in the same manner that the spring 27 seals the surface in Fig. 2.

In Figs. 4, 5 and 6, the seal is substantially the same as in Figs. 1 and 2, with the exception that one of the relatively moving surfaces between the shaft member and the casing member is itself made of the yielding rubber-like material elsewhere described, such as a polymer of chloro-2-butadiene-1,3. We have found that this material when used as a bearing member at this point, is extremely resistant to wear and outlasts many of the favorably accepted bearing metals, and at the same time creates practically no wear on the metallic surface against which it rotates. A preferred embodiment of this feature is shown in Figs. 4, 5 and 6 in which the shaft member 16" carries a part 20" made for example of a polymer of chloro-2-butadiene-1,3 and runs against the smooth hardened steel surface of the part 21". The part 20" is carried in a ring 24" by means of a groove 40 having an inner shoulder 41 just slightly shorter than the ring 20". The shoulder 42 on the outer side of groove 40 is substantially shorter than the ring 20" and permits ring 20" to work outwardly through the groove 43 if necessary and the shoulder 41 acting as a stop. The parts 23", 25", 26", 27", 28", 29", 30", 31", 32", 33" and 34" are made substantially the same and have substantially the same function as the correspondingly numbered parts in Fig. 2. The shaft 16", in this particular embodiment, has been locked against axial movement by means of a lock plate 44 having a groove 45 in which the groove 46 of the shaft 16' is held. We have found that the surface of 20", due to the spring pressure on it, maintains a tight seal against the surface of member 21" while the mechanism is idle, even if the oil is removed from the surfaces, and that these surfaces maintain a tight seal during the operation of the mechanism and that no scoring of the surfaces occurs even if they run dry at the start before they can be lubricated by the oil splashed into and flowing down passageway 29".

In the modification shown in Fig. 7, the yielding take-up is provided between the stationary part of the casing, and the relatively rotary part of the bearing surface, which is for example made of a polymer of chloro-2-butadiene-1,3, is also stationary, but is relatively rotatable with respect to the shaft. To this end a shaft 16''' is provided with a relatively rotatable part or surface 50, in the form of a shoulder. The stationary casing 51 is provided with a stationary part or ring 52 which is relatively rotatable with respect to the part 50, and this part 52 is preferably made of a polymer of chloro-2-butadiene-1,3. A yielding take-up, made of a polymer of chloro-2-butadiene-1,3, is provided between the part 52 and the stationary casing member 51. This is accomplished by providing a ring 53 made of a polymer of chloro-2-butadiene-1,3, one side of which bears against the shoulder 54 of a ring 55 which is loosely mounted around the shaft 16'''. The spring 56 has an axial thrust against the end plate 57 of the casing 51 and its other end thrust against the annular plate 58 which in turn bears against one side of the ring 53. The axial thrust of the spring 56 compresses axially the resilient ring 53 and spreads it radially outward against the cylindrical inner surface 59 of the casing 51. This action provides a hermetic seal between the outer periphery of the ring 53 and between the shoulder 54 and the cooperating end surface of the ring 53 so that no gases can leak into or out of the refrigerating system along these surfaces. Lubricant enters the seal chamber through the passageway 29''' from the crankcase corresponding to the crankcase shown in Figs. 1 and 4. The axial thrust of the spring 56 also seals the surface between the groove in the ring 55 and the ring 52 placed therein. The shoulder 50 of the shaft 16''' is made of hardened steel, as is also the ring 21'' of Fig. 4, and the cooperation between the relatively rotatable surfaces, one of which is a polymer of chloro-2-butadiene-1,3 and the other of which is hardened steel provides an extremely durable sealing sliding surface which is vastly superior to many of the sliding sealing surfaces between hardened steel and many of the graphite bearing bronzes which are now almost universally used in refrigerating systems.

It is to be understood that the rubber-like material chosen should be particularly suited for the particular refrigerant and lubricant being used in the system. Some such materials are preferable to others when used in combination with some of the refrigerants. We have found that for use with $SO_2$ and mineral oil in the refrigerating system, a rubber-like material marketed under the name of "Thiokol" gives excellent results. This material is sulphur polymer of ethylene dichloride which is derived by the interaction of sodium polysulphide and ethylene dichloride, further descriptions of which now exist and are well known in the industrial arts.

While the form of embodiment of the invention as herein disclosed, constitutes a preferred form, it is to be understood that other forms might be adopted, all coming within the scope of the claims which follow.

What is claimed is as follows:

1. A shaft seal including a wall member having a shaft opening therein, a shaft member passing through said shaft opening, one of said members being provided with a sealing surface, a sealing means for sealing the shaft opening including a ring means having a metal sealing surface for making sealing engagement with the sealing surface of one of said members, said ring means having a recess formed therein and a resilient rubber-like packing material within said recess, said packing material having a sealing surface capable of projecting from the recess into sealing engagement with the sealing surface of one of said members before the metal sealing surface can make sealing engagement with the sealing surface of one of said members, and yielding means for compressing the rubber-like packing material into said recess and for holding both the sealing surface of the packing material and the metal sealing surface in sealing engagement with the sealing surface on one of said members.

2. A shaft seal including a wall member having a shaft opening therein, a shaft member passing through said shaft opening, one of said members being provided with a sealing surface, a sealing means for sealing the shaft opening including a ring means surrounding the shaft, said ring means including rings of resilient rubber-like packing material and metal, one within the other, each of said rings having a sealing surface, said resilient rubber-like packing material when in an unstressed state being capable of projecting its sealing surface beyond the sealing surface of the metal ring, and yielding means for compressing said resilient rubber-like packing material and for holding both the sealing surface of the packing material and the metal sealing surface in sealing engagement with the sealing surface upon one of the first mentioned members.

3. A shaft seal including a wall member having a shaft opening therein, a shaft member passing through said shaft opening, said wall member being provided with a sealing surface, a sealing means for sealing the shaft opening including a resilient elastic rubber-like material extending into relatively rotating sealing contact with said sealing surface, said sealing means also including a metal member in relatively rotating sealing contact with said sealing surface.

4. A shaft seal including a wall member having a shaft opening therein, a shaft member passing through said shaft opening, said wall member being provided with a sealing surface, a sealing means for sealing the shaft opening including a resilient elastic rubber-like material extending into relatively rotating sealing contact with said sealing surface, said sealing means also including a metal member in relatively rotating sealing contact with said sealing surface, said rubber-like material and said metal member being assembled together to form a unitary structure, resilient means acting upon said unitary structure for urging said rubber-like member and said metal member into contact with said sealing surface, said metal member serving as a stop to limit the pressure upon the rubber-like material.

EDWARD B. NEWILL.
ALEX A. McCORMACK.